United States Patent
Watanabe et al.

(10) Patent No.: US 12,149,121 B2
(45) Date of Patent: Nov. 19, 2024

(54) STATOR AND MANUFACTURING METHOD THEREOF

(71) Applicant: TOYOTA JIDOSHA KABUSHIKI KAISHA, Toyota (JP)

(72) Inventors: Kohei Watanabe, Okazaki (JP); Masashi Matsumoto, Nagoya (JP); Hiroshi Inano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 362 days.

(21) Appl. No.: 17/664,269

(22) Filed: May 20, 2022

(65) Prior Publication Data

US 2022/0393523 A1 Dec. 8, 2022

(30) Foreign Application Priority Data

Jun. 2, 2021 (JP) ................................ 2021-093205

(51) Int. Cl.
*H02K 1/16* (2006.01)
*H02K 3/12* (2006.01)
(Continued)

(52) U.S. Cl.
CPC .............. *H02K 1/165* (2013.01); *H02K 3/12* (2013.01); *H02K 3/28* (2013.01); *H02K 3/48* (2013.01); *H02K 15/066* (2013.01)

(58) Field of Classification Search
CPC ............ H02K 1/16; H02K 1/165; H02K 3/12; H02K 3/14; H02K 3/28; H02K 3/48;
(Continued)

(56) References Cited

U.S. PATENT DOCUMENTS

| | | | |
|---|---|---|---|
| 2016/0172919 A1* | 6/2016 | Hattori | H02K 3/48 29/596 |
| 2020/0136482 A1* | 4/2020 | Agapiou | H02K 3/12 |
| 2023/0208217 A1* | 6/2023 | Nagase | H02K 15/024 310/216.011 |

FOREIGN PATENT DOCUMENTS

JP  2019-129658 A  8/2019
JP  2019-205244 A  11/2019
(Continued)

OTHER PUBLICATIONS

Kato, Machine Translation of JP2020048277, Mar. 2020 (Year: 2020).*

(Continued)

*Primary Examiner* — Eric Johnson
(74) *Attorney, Agent, or Firm* — Finnegan, Henderson, Farabow, Garrett and Dunner, LLP

(57) ABSTRACT

A stator may include a stator core and a coil. The stator core may include: a first portion; a second portion; and a first intermediate portion interposed between the first portion and the second portion in the axial direction. A first segment conductor and a second segment conductor may overly each other in a circumferential direction of the stator core hr a slot within an area of the first intermediate portion. A first side surface may include a first protrusion provided by the first intermediate portion protruding with respect to the first portion and the second portion. The first segment conductor and the second segment conductor may be held between the first protrusion and a second side surface such that the first, segment conductor and the second segment conductor are connected with each other.

12 Claims, 16 Drawing Sheets

(51) Int. Cl.
*H02K 3/28* (2006.01)
*H02K 3/48* (2006.01)
*H02K 15/06* (2006.01)

(58) Field of Classification Search
CPC ...... H02K 3/50; H02K 3/505; H02K 15/0068;
H02K 15/0081; H02K 15/0087; H02K
15/062; H02K 15/064; H02K 15/065;
H02K 15/067; H02K 15/08; H02K
15/085
See application file for complete search history.

(56) References Cited

FOREIGN PATENT DOCUMENTS

| | | | | |
|---|---|---|---|---|
| JP | 2020048277 A | * | 3/2020 | |
| JP | 2020-205690 A | | 12/2020 | |
| JP | 2023068277 A | * | 5/2023 | |
| WO | WO-2019146499 A1 | * | 8/2019 | |
| WO | WO-2022228801 A1 | * | 11/2022 | ............. H02K 1/165 |

OTHER PUBLICATIONS

Kawamura, Machine Translation of JP2023068277, May 2023 (Year: 2023).*
Kawamura, Machine Translation of WO2019146499, Aug. 2019 (Year: 2019).*
Bensing, Machine Translation of WO2022228801, Nov. 2022 (Year: 2022).*

* cited by examiner

STATOR AND MANUFACTURING METHOD THEREOF

TECHNICAL FIELD

The art disclosed herein relates to a stator and a manufacturing method thereof.

BACKGROUND

Cross-Reference to Related Application

This application is a related application of Japanese Patent Application No. 2021-093205 filed on Jun. 2, 2021 and claims priority based on this Japanese patent application, contents of which are hereby incorporated by reference into the present application.

Japanese Patent Application Publication No. 2019-1294558 describes a stator for a motor. The stator includes a stator core having a cylindrical shape. A plurality of slots is provided in an inner circumferential surface of the stator core dong a circumferential direction with intervals between them. The stator core has a coil fixed thereto. The coil is constituted of a plurality of segment conductors each having a U shape. One or more of the segment conductors are inserted into their corresponding slots from one end of the stator (hereinbelow termed first end). Remainder of the segment conductors are inserted into their corresponding slots from the other end of the stator (hereinbelow termed second end). In each slot, an end of the segment conductor inserted into the slot from the first end and an end of the segment conductor inserted into the slot from the second end are electrically connected in the slate overlapping each other in a radial direction of the stator core. As above, the coil is configured by the segment conductors electrically connected to each other.

SUMMARY

As aforementioned, in the stator of Japanese Patent Application Publication No. 2019-129658, the ends of the segment conductors are connected in each slot in the state overlapping each other in the radial direction of the stator core. As such, in a manufacturing process of the stator, the ends of the segment conductors need to be connected in each slot by stacking these ends of the segment conductors in the radial direction of the stator core and pressing a stacked portion thereof in the radial direction of the stator core. Due to this, tool(s) and member(s) for pressing the stacked portion of the ends of the segment conductors were required. The disclosure herein purposes a stator in which segment conductors can easily be connected within each slot.

A stator disclosed herein may comprise: a stator core comprising a cylindrical shape; and a coil fixed to the stator core. The stator core may comprise a first end surface and a second end surface located on opposite sides of the stator core in an axial direction of the stator core. The stator core may comprise: a first portion; a second portion located closer to the second end surface titan the first portion is; and a first intermediate portion interposed between the first portion and the second portion in the axial direction. A slot may be provided in an inner circumferential surface of the stator core, the slot extending along the axial direction across the first portion, the first intermediate portion, and the second portion. The slot may comprise a first side surface and a second side surface facing the first side surface in a circumferential direction of the stator core. The coil may comprise a first segment conductor and a second segment conductor. The first segment conductor may be inserted into the slot from the first end surface. The first segment conductor may extend in the slot from an area of the first portion to an area of the first intermediate portion. An end of the first segment conductor may be located in the slot. The second segment, conductor may be inserted into the slot from the second end surface. The second segment conductor may extend in the slot from an area of the second portion to the area of the first intermediate portion. An end of the second segment conductor may be located in the slot. The first segment conductor and the second segment conductor may overlap each other in the circumferential direction in the slot within the area of the first intermediate portion. The first side surface may comprise a first protrusion provided by the first intermediate portion promoting with respect to the first portion and the second portion. The first segment, conductor and the second segment conductor may be held between the first protrusion and the second side surface such that the first segment conductor and the second segment conductor are connected with each other.

In a manufacturing process of the stator, the first intermediate portion can be rotated with respect to the first and second portions after the first segment conductor is inserted into the slot from the first end surface taxi the second segment conductor is inserted into the slot from the second end surface. When the first intermediate portion is totaled with respect to the first and second portions, the first intermediate portion protrudes beyond the first and second portions at the first side surface. The first protrusion is provided by this protruding first intermediate portion. When the first protrusion is provided on the first side surface, the first and second segment conductors are held between the first protrusion and the second side surface. In the slot within the area of the first intermediate portion, the first and second segment conductors overlap each other in the circumferential direction of the stator core. Due to this, when the first protrusion is provided, the first and second segment conductors are pressed together in their stacked direction (that is, in the circumferential direction of the stator core). Due to this, the first and second segment conductors are connected to each other. As above, in this stator, the first and second segment conductors can easily be connected by rotating the first intermediate portion which is a part of the stator core.

The present disclosure also discloses a manufacturing method of a stator. The method disclosed herein may comprise fixing a coil to a stator core, the stator core comprising a cylindrical shape. The stator core may comprise a first end surface and a second end surface located on opposite sides of the stator core in an axial direction of the stator core. The stator core mas comprise: a first portion; a second portion located closer to the second end surface than the first portion is; and a first Intermediate portion interposed between the first portion and the second portion in the axial direction. A slot may be provided in an inner circumferential surface of the stator core, the slot extending along the axial direction across the first portion, the first intermediate portion, and the second portion. The slot may comprise a first side surface and a second side surface lacing the first side surface in a circumferential direction of the stator core. The coil may comprise a first segment conductor and a second segment conductor. The fixing of the coil to the stator core may comprise: inserting the first segment conductor into the slot from the first end surface; inserting the second segment conductor into the slot from the second end surface; and rotating five first intermediate portion with respect to the first portion and the second portion. The inserting of the first segment conductor into the slot may be performed such that the first segment conductor extends in the slot from an area of the first portion to an area of the first intermediate portion and an end of the first segment conductor is located in the slot. The inserting of the second segment conductor into the slot may be performed such that the second segment conductor extends in the slot from an area of the second portion to the area of the first intermediate portion and an end of the second segment conductor is located in the slot. The inserting of the first segment, conductor into the slot and the inserting of the second segment conductor into the slot are performed such that the first segment conductor and the second segment conductor overlap each other in the circumferential direction in the slot within the area of the first intermediate portion. In the rotating of the first intermediate portion, the first intermediate portion may protrude with respect to the first portion and the second portion at the first side surface to form a first protrusion, and the first segment conductor and the second segment conductor may be connected with each other by being held between the first protrusion and the second side surface.

According to this manufacturing method, the first and second segment conductors can easily be connected by rotating the first intermediate portion which is a part of the stator core.

DETAILED DESCRIPTION

Figure 1:
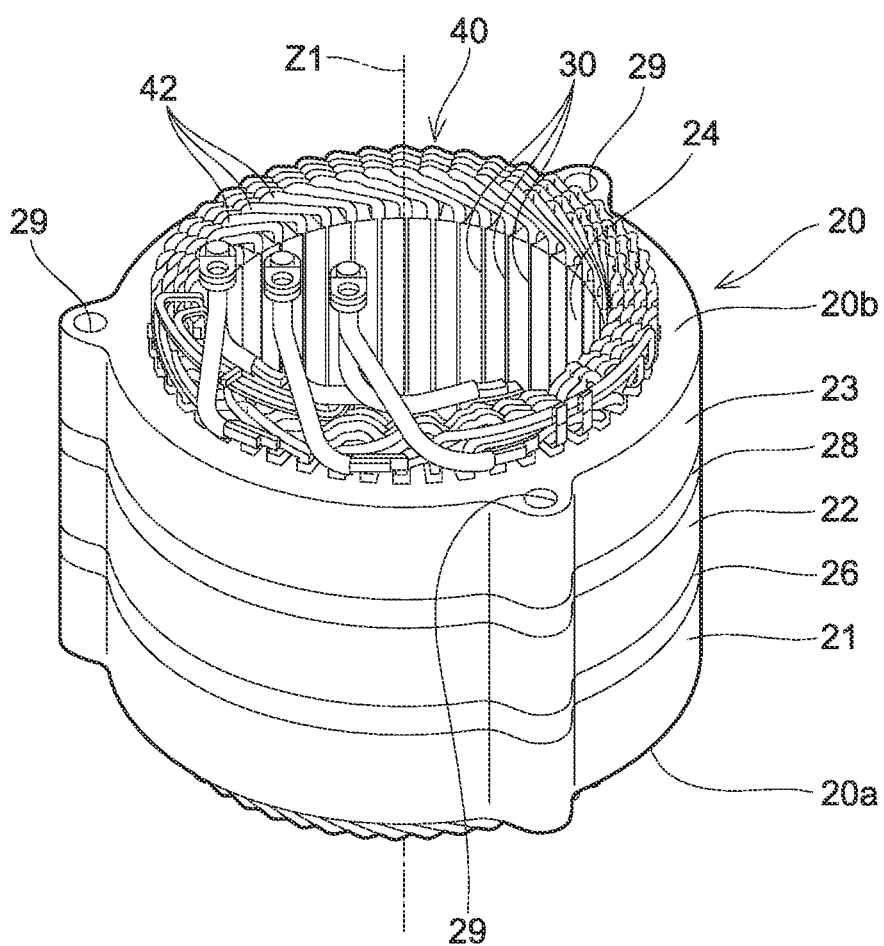
FIG. 1 is a perspective view of a stator.

In an aspect of the stator disclosed herein, the second side surface may comprise a recess provided by the first intermediate portion being recessed with respect to the first portion and the second portion.

In an aspect of the stator disclosed herein, the first segment conductor may comprise a first thick portion and a first thin portion thinner than the first thick portion. The first thin portion may be defined by an indentation provided in a side surface of the first segment conductor in an area including the end of the first segment conductor. The second segment conductor may comprise a second thick portion and a second thin portion thinner than the second thick portion. The second thin portion may be defined by an indentation provided in a side surface of the second segment conductor in an area including the end of the second segment conductor. The first thin portion and the second thin portion may overlap each other in the circumferential direction in the slot within the area of the first intermediate portion in a state where the indentation of the first segment conductor and the indentation of the second segment conductor face each other.

According to this configuration, the first and second segment conductors can more securely be connected.

In an aspect of the stator disclosed herein, the first protrusion may not be in contact with the first thick portion nor the second thick portion.

According to this configuration, the thin portion of the first segment conductor and the thin portion of the second segment conductor can be pressed together with greater force.

In an aspect of the stator disclosed herein, the first protrusion may be in contact with one of the first thin portion and the second thin portion. Both of the second side surface within the area of the first portion and the second side surface within the area of the second portion may be in contact with the other of the first thin portion and the second thin portion.

According to this configuration, the thin portion of the first segment conductor and the thin portion of the second segment conductor can be pressed together with greater force.

In an aspect of the stator disclosed herein, the stator core may comprise: a third portion located closer to the second end surface than the second portion is; and a second intermediate portion interposed between the second portion and the third portion in the axial direction. The slot may extend along the axial direction across the first portion, the first intermediate portion, the second portion, the second intermediate portion, and the third portion. The coil may comprise a third segment conductor and a fourth segment conductor. The third segment conductor may be inserted into the slot from the first end surface in a position shifted along a radial direction of the stator core from the first segment conductor. The third segment conductor may extend in the slot from the area of the second portion to an area of the second intermediate portion. An end of the third segment conductor may be located in the slot. The fourth segment conductor may be inserted into the slot from the second end surface in a position shifted along the radial direction from the second segment conductor. The fourth segment conductor may extend in the slot from an area of the third portion to the area of the second intermediate portion. An end of the fourth segment conductor is located in the slot. The third segment conductor and the fourth segment conductor may overlap each other in the circumferential direction in the slot within the area of the second intermediate portion. The first side surface may comprise a second protrusion provided by the second intermediate portion protruding with respect to the second portion and the third portion. The third segment conductor and the fourth segment inductor are held between the second protrusion and the second side surface such that the third segment conductor and the fourth segment conductor are connected with each other.

According to this configuration, a connecting portion between the third and fourth segment conductors in the slot is arranged at a position shifted from a connecting portion between the first and third segment conductors in a longitudinal direction of the slot. As such, occurrence of leak current between the respective connecting portions can be suppressed.

EMBODIMENTS

A stator 10 of a first embodiment shown in FIG. 1 constitutes a part of a motor. The stator 10 comprises a stator core 20 and a coil 40. The coil 40 is fixed to the stator core 20.

Figure 2:
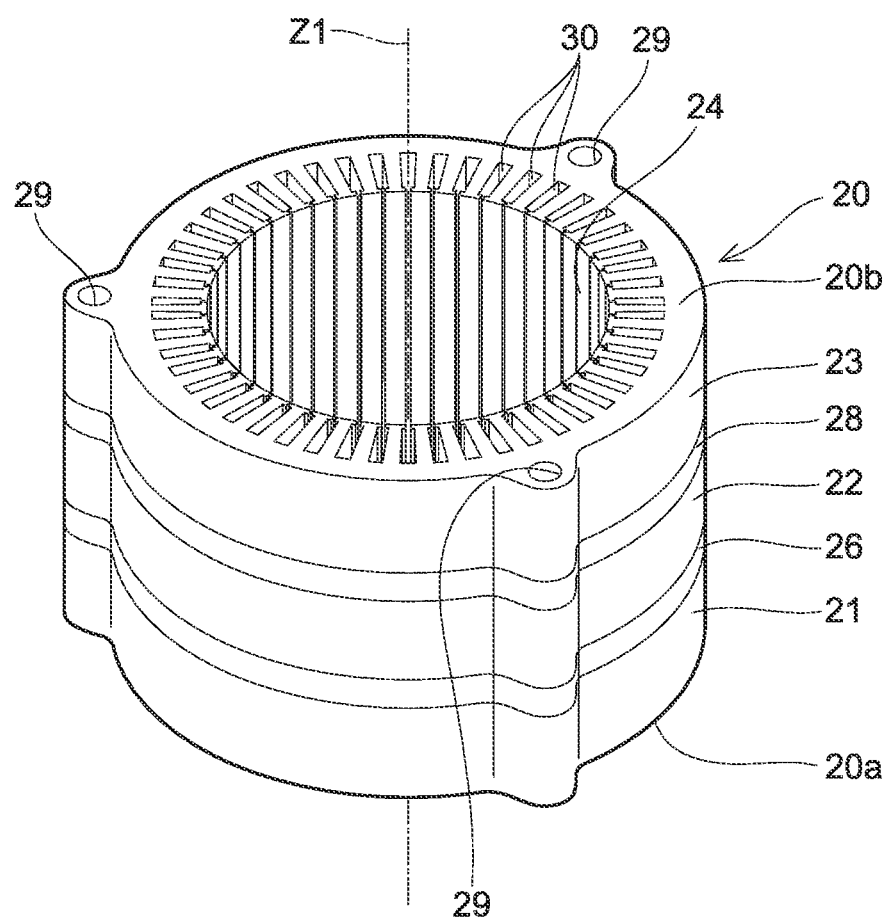
FIG. 2 is a perspective view of a stator core.

As shown in FIG. 2, the stator core 20 has a cylindrical shape having an axis Z1 as its center axis. The stator core 20 comprises an end surface 20a and an end surface 20b on its opposite sides along a direction parallel to the axis Z1 (hereinbelow termed axial direction).

The stator core 20 is separated into multiple portions along the axial direction. The stator core 20 comprises a first portion 21, a first intermediate portion 26, a second portion 22, a second intermediate portion 28, and a third portion 23. The first portion 21, the first intermediate portion 26, the second portion 22, the second intermediate portion 28, and the third portion 23 are arranged in this order from the end surface 20a toward the end surface 20b. A thickness of each of the first intermediate portion 26 and the second intermediate portion 28 in the axial direction is thinner than a thickness of each of the first portion 21, the second portion 22, and the third portion 23 in the axial direction. The first portion 21 is a portion including the first end surface 20a. The first intermediate portion 26 is located closer to the second end surface 20b than the first portion 21 is to the second end surface 20b. The second portion 22 is located closer to the second end surface 20b than the first intermediate portion 26 is to the second end surface 20b. The second intermediate portion 28 is located closer to the second end surface 20b than the second portion 22 is to the second end surface 20b. The third portion 23 is located closer to the second end surface 20b than the second intermediate portion 28 is to the second end surface 20b. The third portion 23 is a portion including the second end surface 20b. The first intermediate portion 26 is located between the first portion 21 and the second portion 22 in the axial direction. The second intermediate portion 28 is located between the second portion 22 and the third portion 23 in the axial direction. Interfaces between these respective portions constituting the stator core 20 extend parallel to a plane perpendicular to the axis Z1. Three fastening holes 29 are defined in an outer circumference of the stator core 20. Each of the fastening holes 29 penetrates the first portion 21, the first intermediate portion 26, the second portion 22, the second intermediate portion 28, and the third portion 23 along the axial direction. Although not shown, hastening members (such as bolts and nuts) are attached to the respective fastening holes 29. The first portion 21, the first intermediate portion 26, the second portion 22, the second intermediate portion 28, and the third portion 23 are fixed to each other by the fastening members provided in the fastening holes 29.

Figure 3:
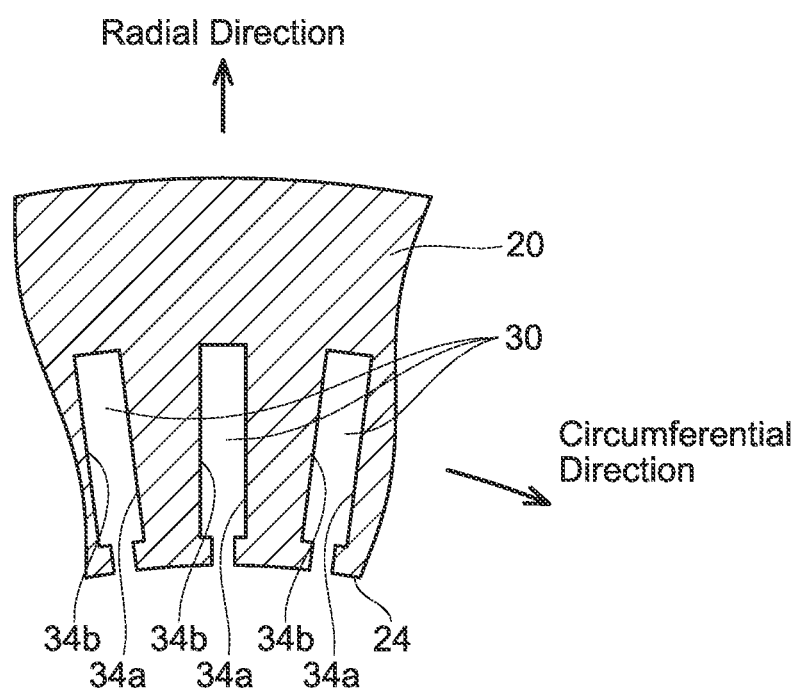
FIG. 3 is a cross-sectional view of the stator core along a plane perpendicularly intersecting an axis Z1.

A plurality of slots 30 is defined in an inner circumferential surface 24 of the stator core 20. Each of the slots 30 is a groove defined in the inner circumferential surface 24. Each slot 30 extends from the end surface 20a to the end surface 20b along the axial direction. As such, each slot 30 extends across the first portion 21, the first intermediate portion 26, the second portion 22, the second intermediate portion 28, and the third portion 23 along the axial direction. As shown in FIG. 3, the slots 30 extend in a radial direction of the stator core 20 in a cross section perpendicular to the axis Z1. The slots 30 each include two side surfaces 34a, 34b in the cross section perpendicular to the axis Z1. The side surfaces 34a, 34b face each other in a circumferential direction, A width of each slot 30 is reduced at its end on the inner circumferential side of the slot 30.

Figure 4:
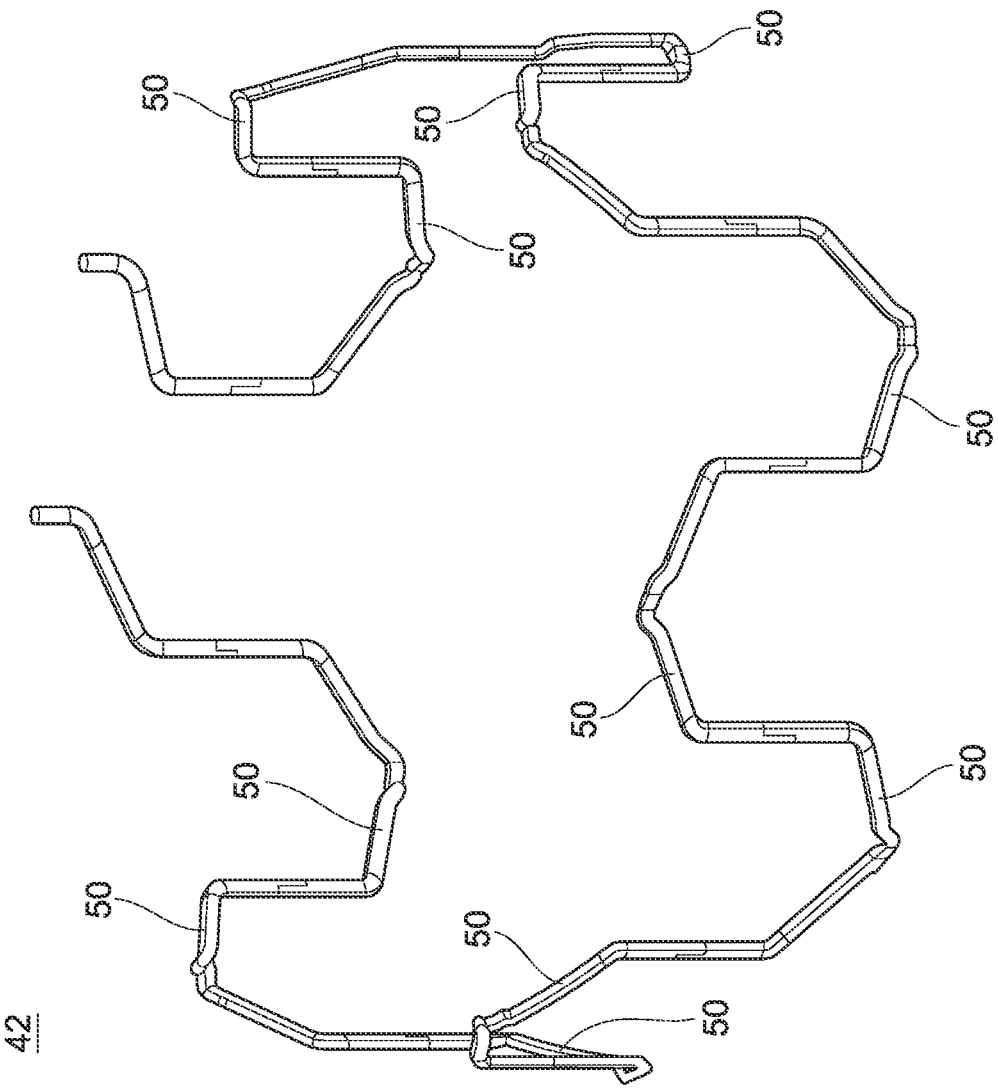
FIG. 4 is a perspective view of a coil wiring.
Figure 5:
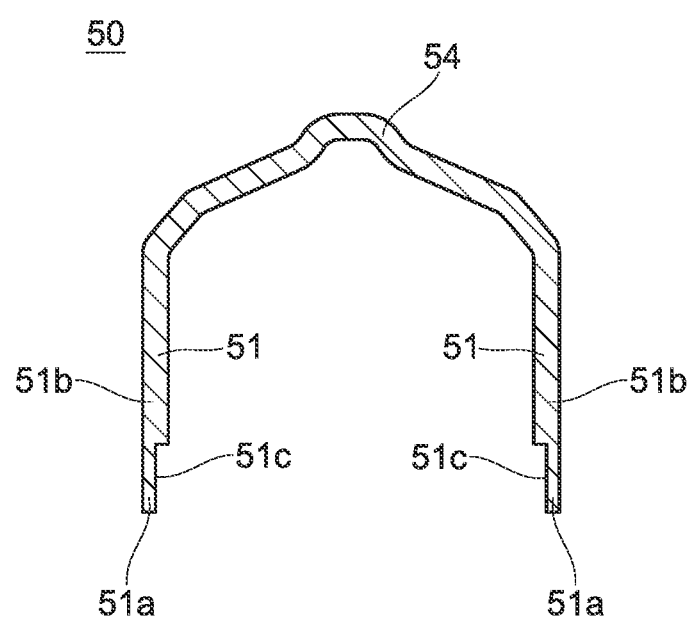
FIG. 5 is a side view of a segment conductor.

As shown in FIG. 1, the coil 40 is fixed to the stator core 20 such that it extends through (lie respective slots 30 of the stator core 20. The coil 40 is constituted of a plurality of coil wirings 42. FIG. 4 shows one of the coil wirings 42. As shown in FIG. 4, the coil wirings 42 each have an undulating shape. More specifically, the coil wirings 42 each extend in the circumferential direction with their undulating pattern extending in the axial direction. The coil wirings 42 are cash configured by a plurality of segment conductors 50 as shown in FIG. 5 being connected to each other. As shown in FIG. 5, each segment conductor 50 has a U-shape. That is, each segment conductor 50 includes two linear portions 51 and a coupling portion 54. The two linear portions 51 extend substantially straight and parallel to each other. The coupling portion 54 couples its corresponding two linear portions 51. A recess 51c is defined in each linear portion 51. The recess 51c is defined in an inner side surface of the linear portion 51 within an area of the linear portion 51 including an end thereof. As such, a thin portion 51a having a reduced thickness is defined in the area of the linear portion 51 including its end. Further, hereinbelow, a portion of each linear portion 51 other than the thin portion 51a is termed a thick portion 51b. The thin portions 51a have a smaller thickness than the thick portions 51b. Hatching lines in FIG. 5 show an insulating film. A surface of each segment conductor 50 is covered by the insulating film except for the thin portions 51a. As shown in FIG. 4, the undulating coil wiring 42 is constituted by the plurality of U-shaped segment conductors 50 connected to each other.

Figure 6:
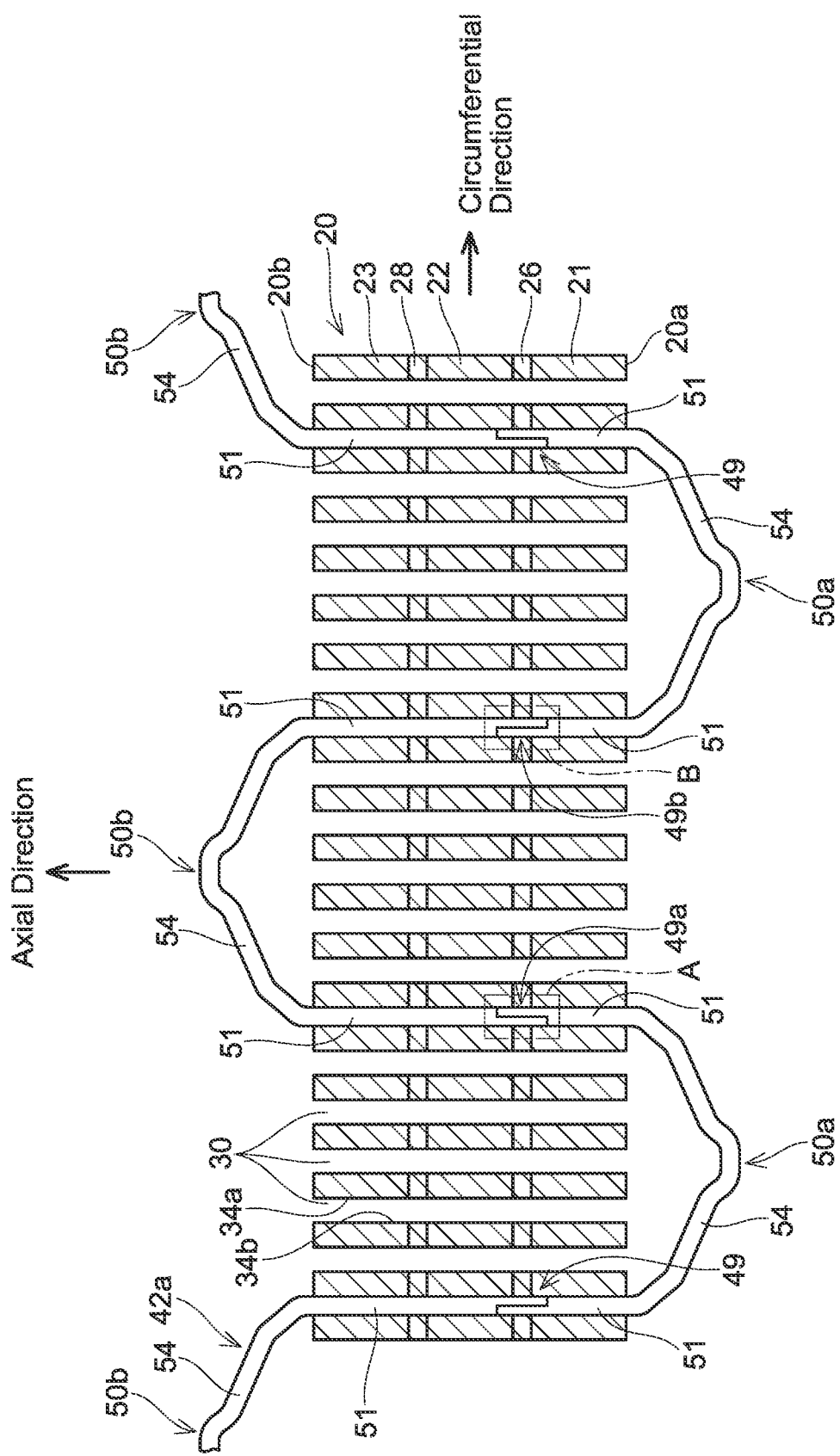
FIG. 6 shows a coil wiring 42*a* attached to the stator core.

FIG. 6 is a plan view of a coil wiring 42a fixed to the stator core 20 as viewed from the center of the stator core 20. A left-right direction of FIG. 6 is the circumferential direction of the stator core 20, and an up-down direction of FIG. 6 is the axial direction of the stator core 20. As shown in FIG. 6, several segment conductors 50a being a part of the segment conductors 50 constituting the coil wiring 42a are inserted in the slots 30 from the end surface 20a. Ends of the respective segment conductors 50a are located inside the slots 30. Segment conductors 50b which are reminders of the segment conductors 50 constituting the coil wiring 42a are inserted in the slots 30 from the end surface 20b. Ends of the respective segment conductors 50b are located inside the slots 30. Within the coil wiring 42a, the linear portions 51 of the segment conductors 50a are shorter than the linear portions 51 of the segment conductors 50b. The linear portions 51 of the segment conductors 50a extend within the slots 30 from an area of the first portion 21 to an area of the second portion 22 via an area of the first intermediate portion 26. The ends of the linear portions 51 of the segment conductors 50a are located within the slots 30 in the area of the second portion 22. The linear portions 51 of the segment conductors 50b extend within the slots 30 from an area of the third portion 23 to the area of the first portion 21 via an area of the second intermediate portion 28, the area of the second portion 22, and the area of the first intermediate portion 26. The ends of the linear portions 51 of the segment conductors 50b are located within the slots 30 in the area of the first portion 21. In the slots 30 in the area of the first intermediate portion 26, the linear portions 51 of the segment conductors 50*a* and the linear portions 51 of the segment conductors 50*b* overlap each other in the circumferential direction. As shown in areas A, B in FIG. 6, the linear portions 51 of the segment conductors 50*a* are connected to the linear portions 51 of the segment conductors 50*b* at connecting portions 49 located within the slots 30 in the area of the first intermediate portion 26.

Figure 7:
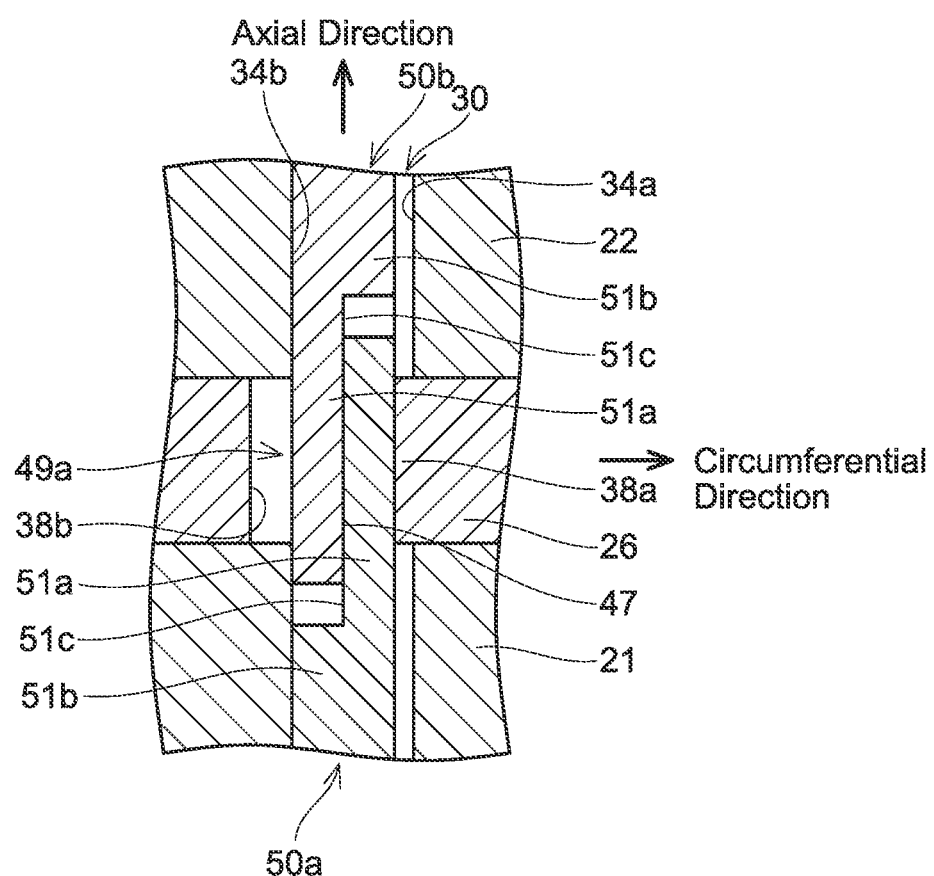
FIG. 7 is an enlarged view of a connecting portion within an area A of FIG. 6.

FIG. 7 shows a connecting portion 49*a* located in the area A of FIG. 6. As shown in FIG. 7, in the slot 30 in the area A, the thin portion 51*a* of the segment conductor 50*a* and the thin portion 51*a* of the segment conductor 50*b* overlap each other in the circumferential direction of the stator core 20 with the recess 51*c* of the segment conductor 50*a* and the recess Sic of the segment conductor 50*b* facing each other. The thin portion 51*a* of the segment conductor 50*a* extends in the slot 30 from the area of the first portion 21 to the area of the second portion 22 via the area of the first intermediate portion 26. The thin portion 51*a* of the segment conductor 50*b* extends in the slot 30 from the area of the second portion 22 to the area of the first portion 21 via the area of the first intermediate portion 26. As such, the thin portion 51*a* of the segment conductor 50*a* and the thin portion 51*a* of the segment conductor 50*b* overlap each other in the circumferential direction in the area of the first intermediate portion 26 and its vicinity. The thin portion 51*a* of the segment conductor 50*a* is located closer to the side surface 34*a* than the thin portion 51*a* of the segment conductor 50*b* is to the side surface 34*a*.

As shown in FIG. 7, at the side surface 34*a*, the first intermediate portion 26 protrudes beyond the first portion 21 and the second portion 22. Hereinbelow, a portion of the first intermediate portion 26 that is protruding will be termed a protrusion 38*a*. The protrusion 38*a* is in contact with the thin portion 51*a* of the segment conductor 50*a*. The protrusion 38*a* is not in contact with the thick portion 51*b* of the segment conductor 50*a*. Further, the protrusion 38*a* is not in contact with live segment conductor 50*b*. A clearance is provided between the side surface 34*a* in the area of the first portion 21 and the segment conductor 50*a*. However, five side surface 34*a* in the area of the first portion 21 may partially lie in contact with the segment conductor 50*a*. A clearance is provided between the side surface 34*a* in the area of the second portion 22 and the segment conductor 50*a*. A clearance is provided also between the side surface 34*a* in the area of the second portion 22 and the segment conductor 50*b*. However, the side surface 34*a* in the area of the second portion 22 may partially of in contact with the segment conductor 50*b*. At the side surface 34*b*, the first intermediate portion 26 is recessed with respect to the first portion 21 and the second portion 22. Hereinbelow, a portion of the first intermediate portion 26 that is recessed in the side surface 34*b* will be termed a recess 38*b*. The recess 38*b* is not in contact with the segment conductors 50*a*, 50*b*. The side surface 34*b* in the area of the first portion 21 is in contact with the thick portion 51*b* of the segment conductor 50*a* and the tip end of the thin portion 51*a* of the segment conductor 50*b*. The side surface 34*b* in the area of the second portion 22 is in contact with the thick portion 51*b* and a base end of the thin portion 51*a* of the segment conductor 50*b*.

The thin portions 51*a* of the segment conductors 50*a* and the thin portions 51*a* of the segment conductors 50*b* is connected to each other by being held between the protrusion 38*a* and side surface 34*b* (more specifically, the side surface 54*b* in the area of the first portion 21 and in the area of the second portion 22). That is, the protrusion 38*a* presses the thin portion 51*a* of the segment conductor 50*a* against the thin portion 51*a* of the segment conductor 50*b*. Further, the side surface 34*b* in the area of the first portion 21 and in the area of the second portion 22 supports the thin portion 51*a* of the segment conductor 50*b* from a side opposite to the protrusion 38*a*. Thus, a surface of the recess 51*c* of the segment conductor 50*a* are in contact with a surface of the recess 51*c* of the segment conductor 50*b* in a pressed state. That is, the thin portion 51*a* of the segment conductor 50*a* and the thin portion 51*a* of the segment conductor 50*b* are connected to each other by pressure applied by the protrusion 38*a* and the side surface 34*b*. As aforementioned, the thin portions 51*a* are not covered by the insulating protective films. Thus, the segment conductors 50*a* and the segment conductors 50*b* are electrically connected to each other at the connecting portion 40*a* as shown in FIG. 7.

Figure 8:
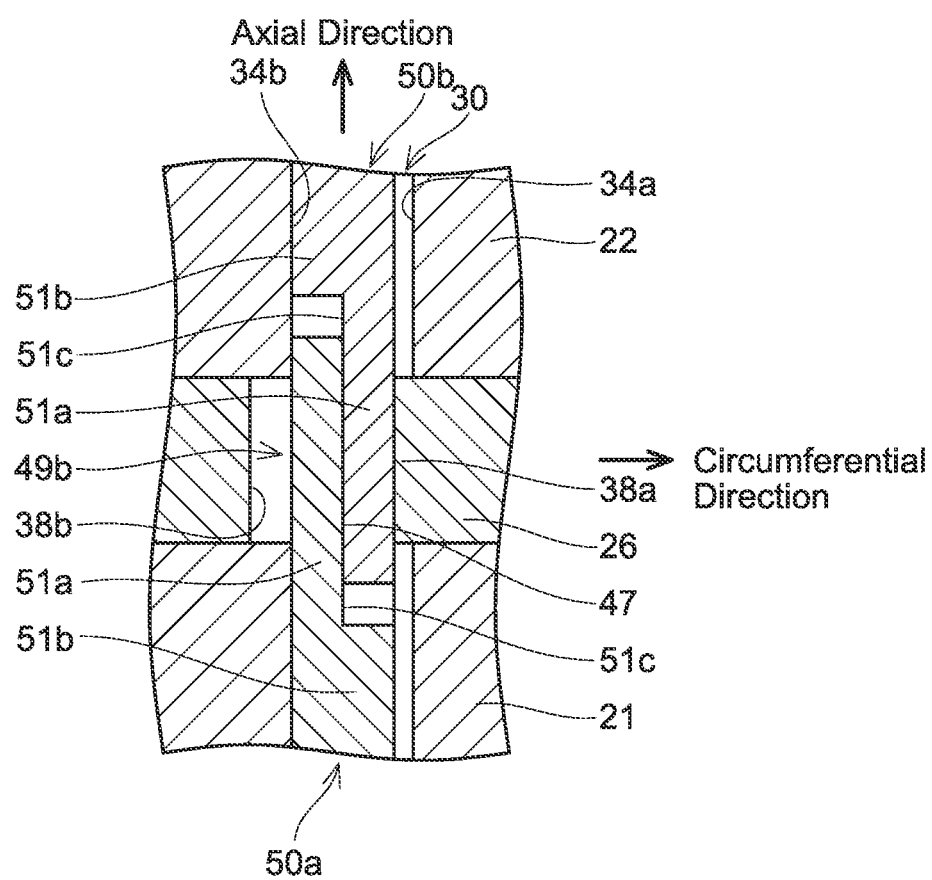
FIG. 8 is an enlarged view of the connecting portion within an area B of FIG. 6.

FIG. 8 shows the connecting portion 49*b* located in the area B of FIG. 6. In the connecting portion 49*b*, the thin portion 51*a* of the segment conductor 50*b* is located closer to the side surface 34*a* than the thin portion 51*a* of the segment conductor 50*a* is to the side surface 34*a*. The other configurations of the connecting portion 49*b* are the same as those of the connecting portion 49*a*. In the connecting portion 49*b* as well, the thin portion 51*a* of the segment conductor 50*a* and the thin portion 51*a* of the segment conductor 50*b* are connected by being held between the protrusion 38*a* and the side surface 34*b*.

As above, the segment conductors 50*a*, 50*b* of the coil wiring 42*a* are fixed to each other by being held between the protrusions 38*a* and the side surfaces 34*b*. As such, a coupling material is not provided on contact interfaces 47 between the segment conductors 50*a* and the segment conductors 50*b*. That is, the contact interfaces 47 are physically and electrically connected without coupling materials. All the segment conductors 50 constituting the coil wiring 42*a* are connected to each other by the same configurations. Further, the segment conductors 50 of other coil wirings 42 are also connected by the same connection structures as those of the segment conductors 50 of the coil wiring 42*a*.

Figure 9:
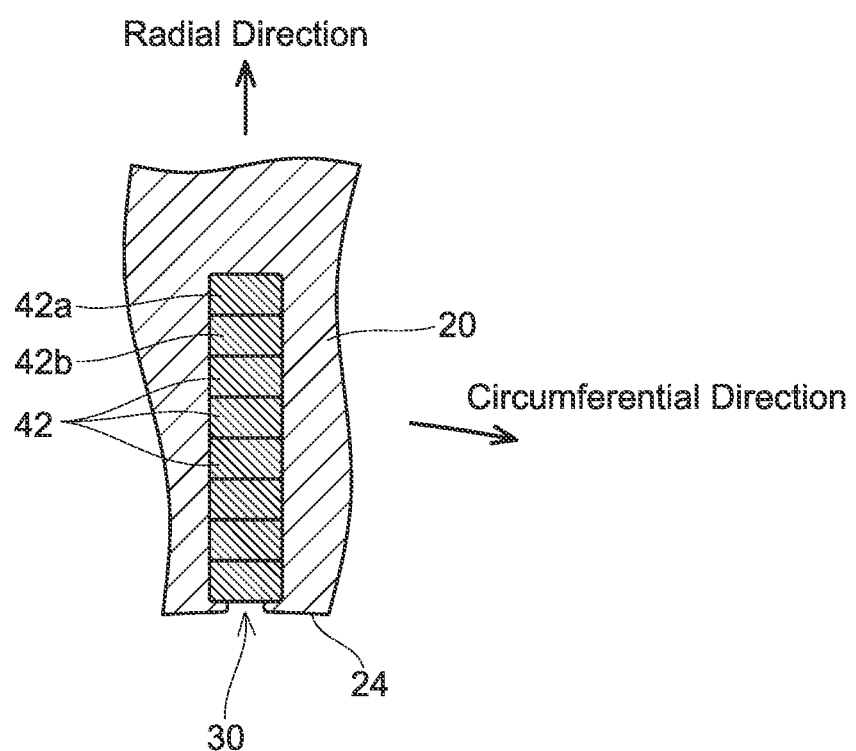
FIG. 9 is a cross-sectional view of a slot and coil wirings along a plane perpendicularly intersecting the axis Z1.
Figure 10:
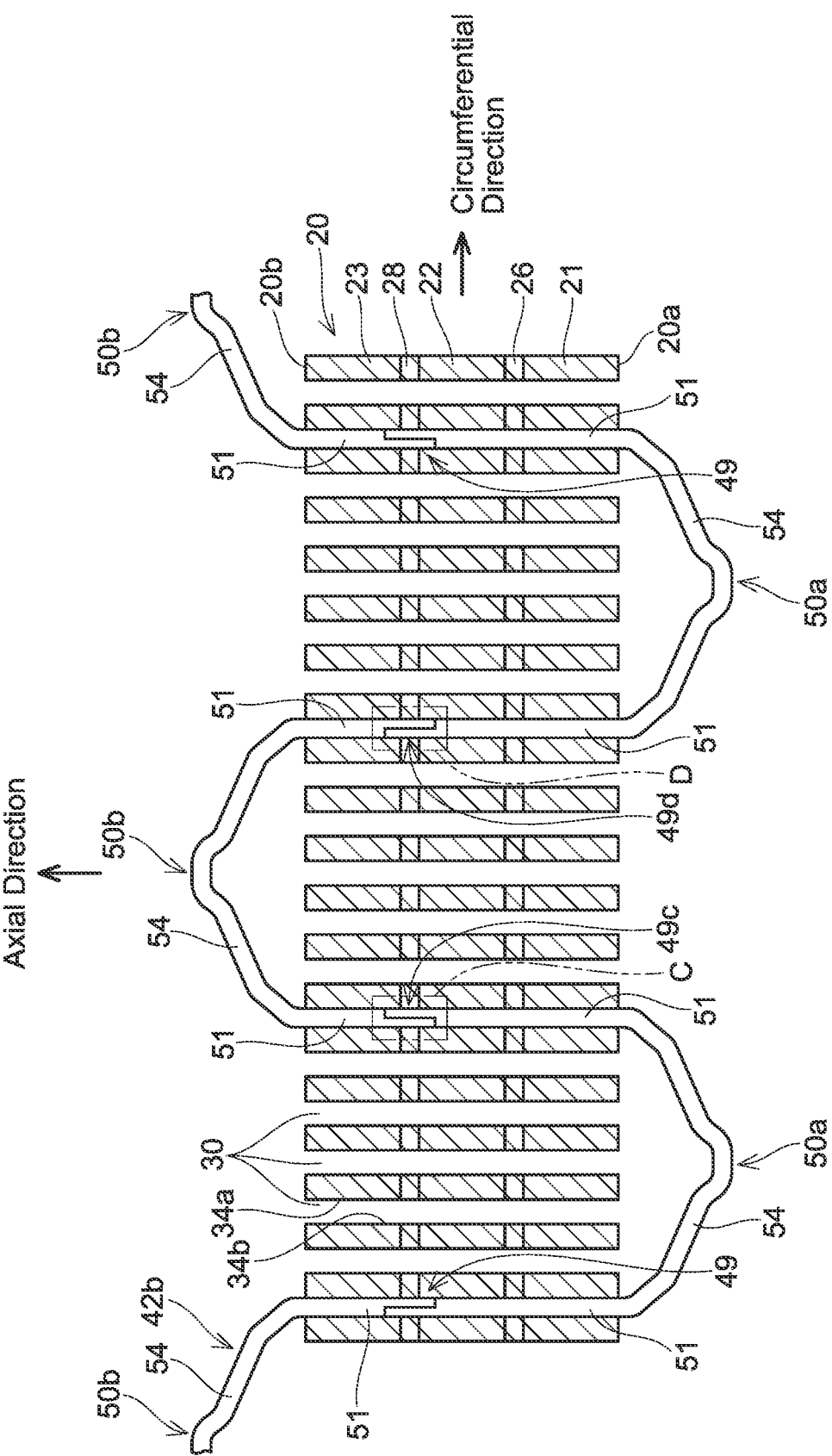
FIG. 10 shows a coil wiring 42*b* attached to the stator core.
Figure 11:
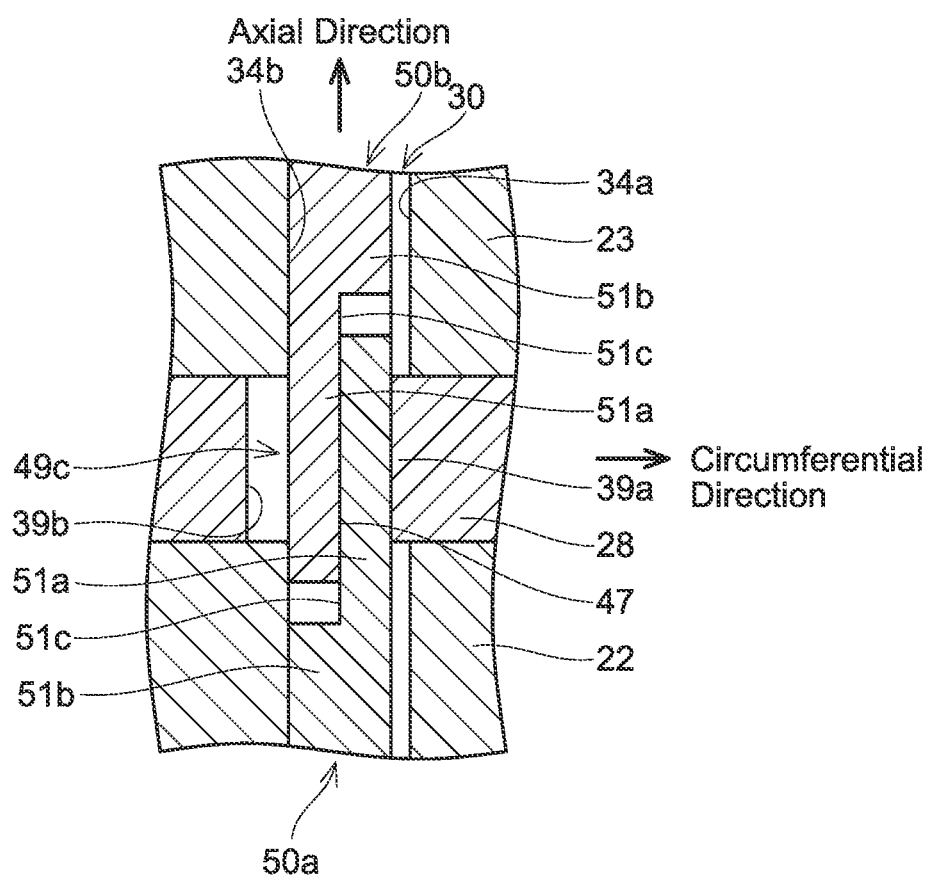
FIG. 11 is an enlarged view of the connecting portion within an area C of FIG. 10.
Figure 12:
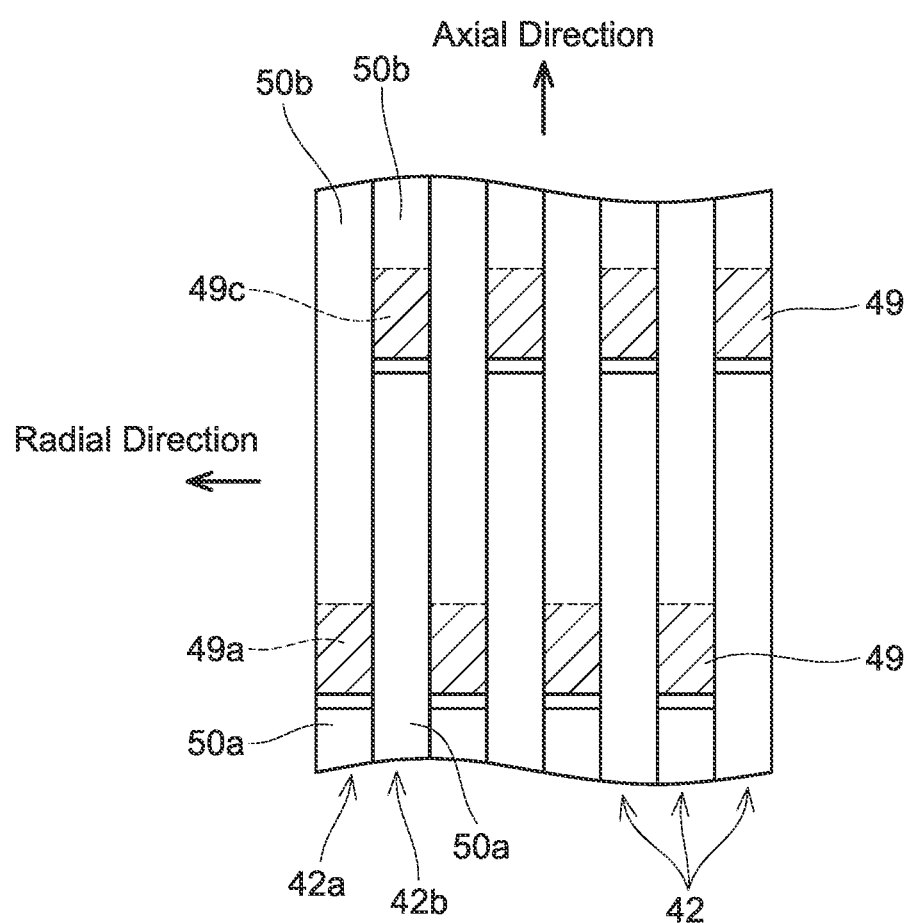
FIG. 12 shows an arrangement of a plurality of coil wirings in a slot along a plane parallel to a radial direction and an axial direction.

As shown in FIG. 9, a plurality of coil wirings 42 is inserted in each slot 30, in each slot 30, the plurality of coil wirings 42 is stacked in the radial direction of the stator core 20. As shown in FIG. 9, a coil wiring 42*b* is arranged adjacent to the coil wiring 42*a*. FIG. 10 is a plan view of the coil wiring 42*b* fixed to the stator core 20 as viewed from the center of Use stator core 20. As shown in FIG. 10, in the coil wiring 42*b*, respective linear portions 51 of segment conductors 50*a* are longer than respective linear portions 51 of segment conductors 50*b*. As shown in FIG. 10, the linear portions 51 of the segment conductors 50*a* extend within the slots 30 from the area of the first portion 21 to the area of the third portion 23 via the area of the first intermediate portion 26, the area of the second portion 22, and the area of the second intermediate portion 28. As shown in FIG. 10, ends of the linear portions 51 of the segment conductors 50*a* are located within the slots 30 in the area of the third portion 23. As shown in FIG. 10, the linear portions 51 of the segment conductors 50*b* extend within the slots 30 from the area of the third portion 23 to the area of the second portion 22 via the area of the second intermediate portion 28. As shown in FIG. 10, ends of the linear portions 51 of the segment conductors 50*b* are located within the slots 30 in the area of the second portion 22. As shown in FIG. 10, in the slots 30 in the area of the second intermediate portion 28, the linear portions 51 of the segment conductors 50*a* and the linear portions 51 of the segment conductors 50*b* overlap each other in the circumferential direction. As shown in areas C, D in FIG. 10, the linear portions 51 of the segment conductors 50a are connected to the linear portions 51 of the segment conductors 50b at connecting portions 49 located within the slots 3b in the area of the second intermediate portion 28. A connecting portion 49c in the area C has the substantially the same configuration as the connecting portion 49a in the area A. That is, as shown in FIG. 11, in the side surface 34a in the area C, the second intermediate portion 28 comprises a protrusion 39a that protrudes beyond the second portion 22 and the third portion 23. In the connecting portion 49c, a thin portion 51a of the segment conductor 50a and a thin portion 51a of the segment conductor 50b are physically and electrically connected by being held between the protrusion 39a and the side surface 34b. FIG. 12 shows a positional relationship between the connecting portions 49a and the connecting portions 49c in the axial direction. As shown in FIG. 12, the segment conductors 50a of the coil wirings 42b are inserted into the slots 30 at positions that are shifted along the radial direction from the segment conductors 50a of the coil wirings 42a. The segment conductors 50b of the coil wirings 42b are inserted into the slots 30 at positions that are shifted along the radial direction from the segment conductors 50b of the coil wirings 42a. As shown in FIG. 12, positions of the connecting portions 49a and the connecting portions 49c in the axial direction differ between the adjacent coil wirings 42a, 42b. As aforementioned, the thin portions 51a of the segment conductors 50 are not covered by insulating films. As such, when the positions of the connecting portions 49a, 49c overlap each other in the axial direction between the adjacent coil wirings 42a, 42b, leak current occurs between the connecting portions 49a, 49c. The leak current can be prevented by virtue of difference in the positions of the connecting portions 49a, 49c in the axial direction as in FIG. 12. In all of the coil wirings 42 including the coil wirings 42a, 42b, the connecting portions 49 are arranged such that the positions of the adjacent connecting portions 49 do not overlap between the adjacent coil wirings 42.

In a connecting portion 49d in the area D of FIG. 10, the thin portion 51a of the segment conductor 50b is located closer to the side surface 34a than the thin portion 51a of the segment conductor 50a is to the side surface 34a. The other configurations of the connecting portion 49d are the same as those of the connecting portion 49c. As with the connecting portions 49a, 49c shown in FIG. 12, the connecting portions 49b, 49d are arranged such that their positions do not overlap between the adjacent coil wirings 42. Thus, occurrence of leak current between the connecting portion 49b and the connecting portions 49d is prevented.

Figure 13:
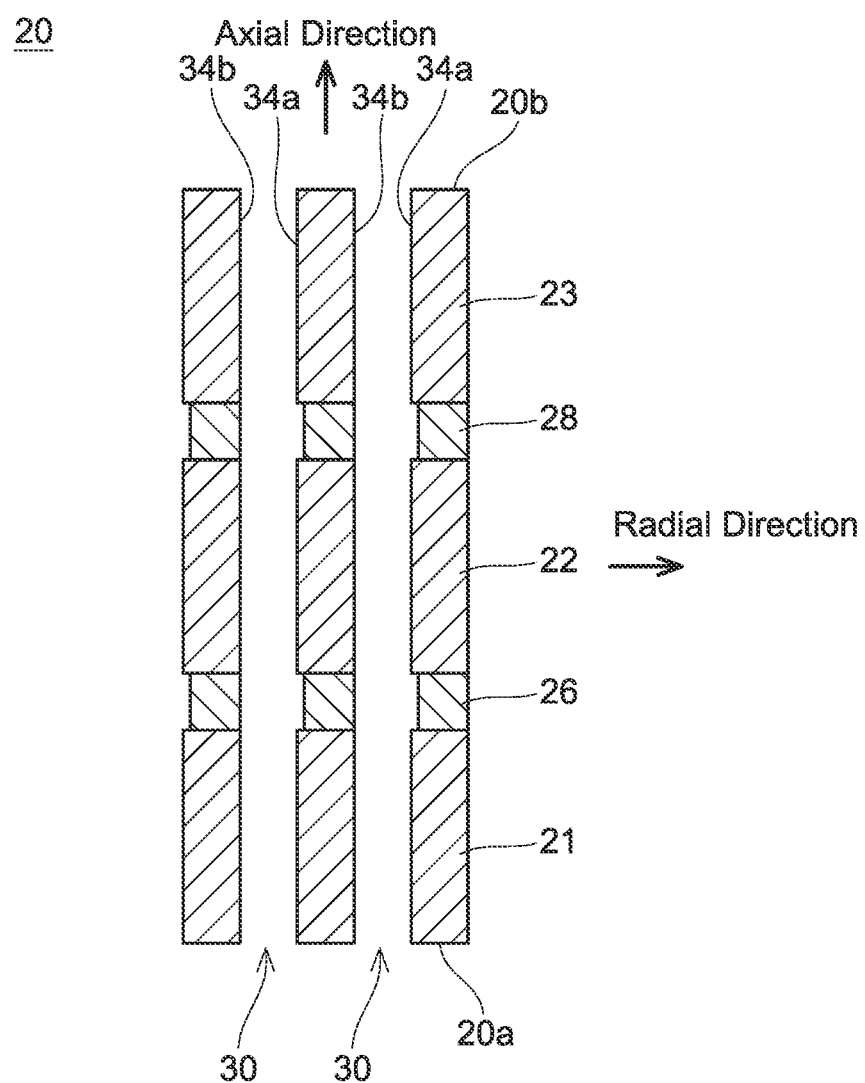
FIG. 13 is a cross-sectional view showing locations of intermediate portions in the state in which protrusions 38*a*, 39*a* are not provided.
Figure 14:
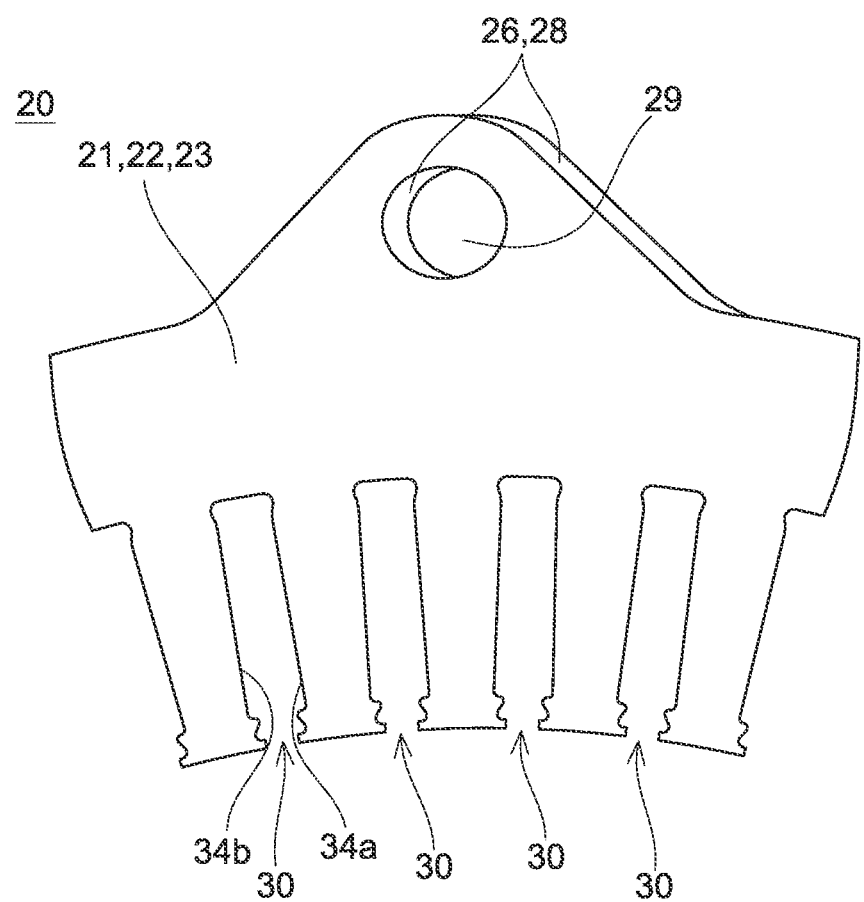
FIG. 14 is a plan view showing the locations of the intermediate portions in the state in which the protrusions 38*a*, 39*a* are not provided.
Figure 15:
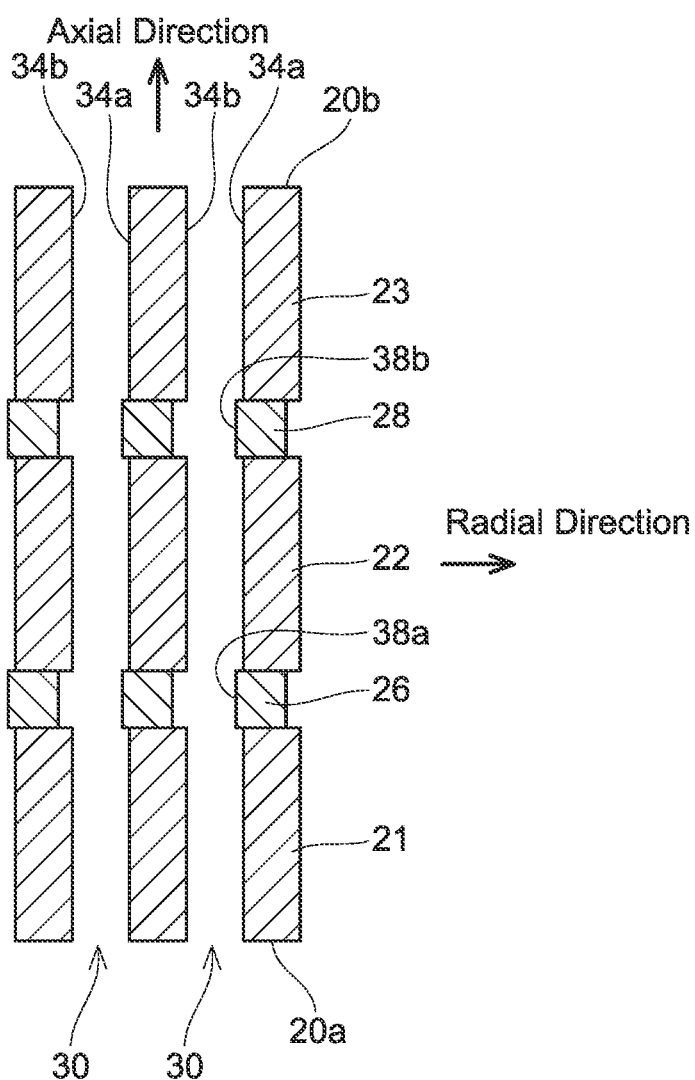
FIG. 15 is a cross-sectional view showing the locations of the intermediate portions in the state in which the protrusions 38*a*, 39*a* are provided.
Figure 16:
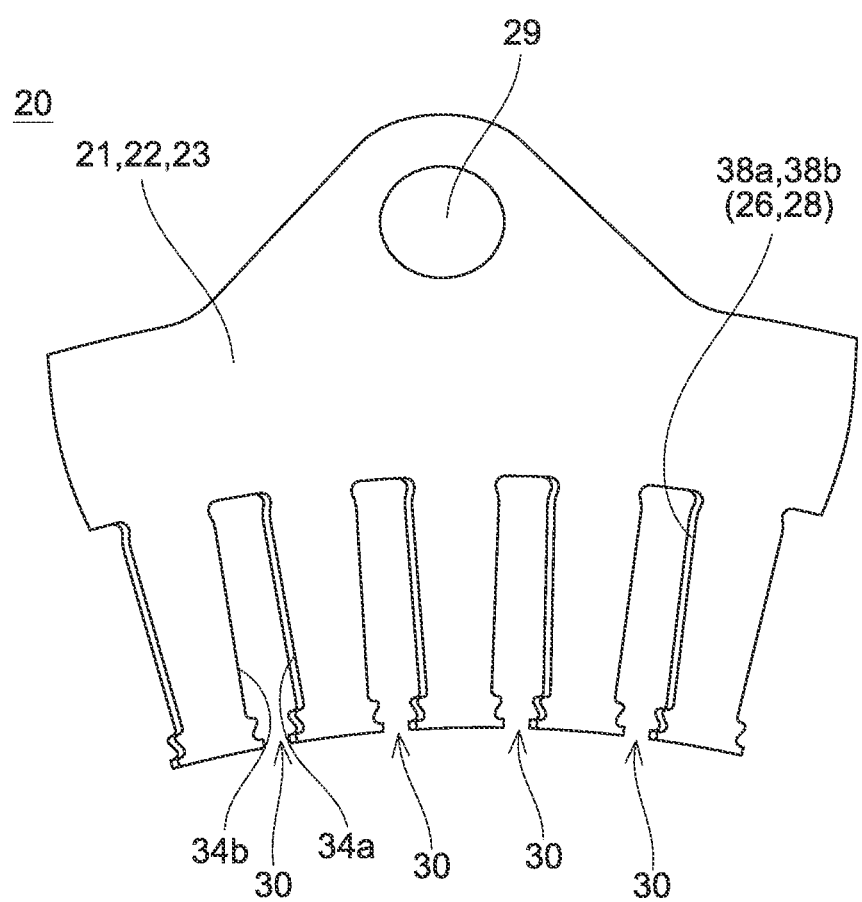
FIG. 16 is a plan view showing the locations of the intermediate portions in the state in which the protrusions 38*a*, 39*a* are provided.

Next, a manufacturing method of the stator 10 will be described. In the stator core 20 before the coil 40 is fixed thereto, the first intermediate portion 26 and the second intermediate portion 28 are freely rotatable about lire axis Z1 with respect to the first portion 21, the second portion 22, and the third portion 23. The intermediate portions 26, 28 can rotate with respect to the portions 21 to 23 between a position shown in FIGS. 13, 14 and a position shown in FIGS. 15, 16. In FIGS. 13 and 14, no protrusion is provided at the side surfaces 34a, 34b of the slots 30. Further, at this position, as shown in FIG. 14, a positional displacement occurs between the intermediate portions 26,28 and the portions 21 to 23 on an outer circumferential surface of the stator core 20. Further, at this position, a positional displacement occurs between the intermediate portions 26,28 and the portions 21 to 23 on an inner circumferential hole 29 as well. As such, at this position, the fastening members cannot be attached to the fastening holes 29. When the intermediate portions 26, 28 are rotated counterclockwise from the position shown in FIGS. 13 and 14, the intermediate portions 26, 28 move to the position shown in FIGS. 15 and 16. In this state, the protrusions 38a, 39a are provided at the side surfaces 34a of the slots 30. At this position, as shown in FIG. 16, the positions of the intermediate portions 26, 28 and the portions 21 to 23 match on the outer circumferential surface of the stator core 20. Further at this position, the positions of the intermediate portions 26, 28 and the portions 21 to 23 also match on the inner circumferential surface of each of the fastening holes 29. Thus, at this position, the fastening members can be attached to the fastening holes 29.

The manufacturing method of the stator 10 includes fixing the coil 40 to the suitor core 20. The fixing of the coil 40 to the stator core 20 includes inserting the segment conductors 50a, 50b into the slots 30 and totaling the intermediate portions 26, 28.

In the inserting of the segment conductors 50a, 50b into the slots 30, firstly angles of the intermediate portions 26, 28 are adjusted to angles shown in FIGS. 13 and 14. Due to this, the inserting of the segment, conductors 50a, 50b into the slots 30 is carried out in the state in which no protrusion 38a exists at the aide surfaces 34a of the slots 30. Then, all the segment conductors 50 constituting the coil 40 are inserted info their corresponding slots 30. Each of the segment conductors 50a is inserted into its corresponding slot 30 from the end surface 20a, and each of the segment conductors 50b is inserted into its corresponding slot 30 from the end surface 20b. Since the protrusions 38a are not provided within the slots 30, the segment conductors 50 can easily be inserted into the slots 30. When the segment conductors 50a, 50b constituting the coil wiring 42a are inserted into their corresponding slots 30 as shown in FIG. 6, the thin portions 51a of the segment conductors 50a and the thin portions 51a of the segment conductors 50b overlap each other in the circumferential direction in the area of the first intermediate portion 26. When the segment conductors 50a, 50b constituting the coil wiring 42b are inserted into their corresponding slots 30 as shown in FIG. 10, the thin portions 51a of the segment conductors 50a and the thin portions 51a of the segment conductors 50b overlap each other in the circumferential direction in the area of the second intermediate portion 28. All the segment conductors 50 constituting the coil 40 are inserted into their corresponding slots 30 as above.

Next, the intermediate portions 26, 28 are rotated with respect to the portions 21 to 23. Here, the intermediate portions 26, 28 are rotated to the position shown in FIGS. 15 and 16. By doing so, the intermediate portions 26, 28 protrude at the side surfaces 34a of the slots 30, and the protrusions 38a, 39a are thereby provided. As a result, as shown in FIGS. 7, 8, and 11, the connecting portions 49 are pressed by the protrusions 38a, 39a. That is, the thin portions 51a of the segment conductors 50a and the thin portions 51a of the segment conductors 50b are held and pressed together by the protrusions 38a and the side surfaces 34b (more specifically, the side surfaces 34b in the areas of the portions 21 to 23). One to this, the thin portions 51a of the segment conductors 50a and the thin portions 51a of the segment conductors 50b are physically and electrically connected, in the connecting portion 49a shown in FIG. 7, the protrusion 38a is in contact with the thin portion 51a of the segment conductor 50a while not in contact with the thick portion 51b of the segment conductor 50a nor the thick portion 51b of the segment conductor 50b. As such, the protrusion 38a can effectively press the thin portion 51a of the segment conductor 50a. Further, in this connecting portion 49a, the side surface 34b in the area of the first portion 21 is in contact with the tip end of the thin portion 51a of the segment conductor 50b. Further, the side surface 34b in the area of the second portion 22 is in contact with the base end of the thin portion 51a of the segment conductor 50b. As such, both ends of the thin portion 51a of the segment conductor 50b are supported by the side surface 34b in the area of the first portion 21 and in the area of the second portion 22. Thus, a stack of the thin portion 51a of the segment conductor 50a and the thin portion 51a of the segment conductor 50b can effectively be pressed together. As above, since the stack can efficiently be pressed by the protrusion 38a and side surface 34b, the segment conductor 50a and the segment conductor 50b can firmly be connected to each other and the segment conductor 50a and the segment conductor 50b can also be connected with low resistance, in the other connecting portions 49 as well, the segment conductors 50a and the segment conductors 50b are similarly connected. By the respective segment conductors 50 being connected to each other, the coil 40 shown in FIG. 1 is configured. That is, the state in which the coil 40 is fixed to the stator core 20 can be realized. After the intermediate portions 26, 28 have rotated to the position shown in FIGS. 15 and 16, the fastening members are attached to the fastening holes 29, and the intermediate portions 26,28 and the portions 21 to 23 are thereby fixed to each other. The stator 10 shown in FIG. 1 is thereby completed.

As above, in this manufacturing method, the segment conductors 50 can be connected to each Other by inserting the segment conductors 50 into the slots 30 and thereafter rotating the intermediate portions 26, 28 with respect to the portions 21 to 23. The segment conductors 50 can easily be connected to each other, and the coil 40 can easily be fixed to the stator core 20. Further, since the segment conductors 50 do not need to be pressed by a tool in the slots 30, such a tool for pressing them is not necessary. Thus, changing the tool for pressing is not necessary even when multiple types of stators with stator cores 20 basing different shapes are manufactured, and the multiple types of stators can efficiently be manufactured. Further, in this manufacturing method, the segment conductors 50 are connected to each other by holding them between the protrusions 38a and the side surfaces 34b, the coaling material is not necessary on the contact interfaces between the segment conductor 50. Thus, the stator 10 can more efficiently be manufactured. Further, by connecting the segment conductors 50 within the slots 30 as above, correcting portions of segment conductors does not need to be provided outside the slots 30. Due to this, size and weight of the coil 40 can be reduced, and copper loss in the coil 40 can be reduced. In another embodiment, the coupling material may be provided on the contact interfaces of the segment conductors.

In the aforementioned embodiment, the protrusions 38a, 39a are provided at the side surfaces 34a of the slots 30, however, protrusions defined by the intermediate portions 26, 28 protruding may be provided at the side surfaces 34b instead of the side surfaces 34a.

Further, in the aforementioned embodiment, the coil 40 has the undulating shape. However, the art disclosed herein may be applied to a winding coil. The winding coil is a coil that is wound on a stator core such that its coil wirings are inserted multiple times into common slots.

The end surface 20a in the aforementioned embodiment is an example of a first, end surface. The end surface 20b in the aforementioned embodiment is an example of a second end surface. The side surfaces 34a in the aforementioned embodiment are examples of a first side surface. The side surfaces 34b in the aforementioned embodiment are examples of a second side surface. The segment conductors 50a in the aforementioned embodiment are examples of a first, segment conductor and a thin segment conductor. The segment, conductors 50b in the aforementioned embodiment are examples of a second segment conductor and a fourth segment, conductor. The protrusions 38a in the aforementioned embodiment are examples of a first protrusion. The protrusions 39a in the aforementioned embodiment are examples of a second protrusion. The thin portions 51a of the segment conductors 50a in the aforementioned embodiment are examples of a first thin portion. The thick portions 51b of the segment conductors 50a in the aforementioned embodiment are examples of a first thick portion. The thin portions 51a of the segment conductors 50b in the aforementioned embodiment are examples of a second thin portion. The thick portions 51a of the segment conductors 50b in the aforementioned embodiment are examples of a second thick portion. The recesses 51c in the aforementioned embodiment are examples of an indentation.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:
1. A stator comprising:
a stator core comprising a cylindrical shape; and
a coil fixed to the stator core,
wherein
the stator core comprises a first end surface and a second end surface located on opposite sides of the stator core in an axial direction of the stator core,
the stator core comprises:
a first portion;
a second portion located closer to the second end surface than the first portion is; and
a first intermediate portion interposed between the first portion and the second portion in the axial direction,
a slot is provided in an inner circumferential surface of the stator core, the slot extending along the axial direction across the first portion, the first intermediate portion, and the second portion,
the slot comprises a first side surface and a second side surface facing the first side surface in a circumferential direction of the stator core,
the coil comprises a first segment conductor and a second segment conductor,
the first segment conductor is inserted into the slot from the first end surface,
the first segment conductor extends in the slot from an area of the first portion to an area of the first intermediate portion,
an end of the first segment conductor is located in the slot,
the second segment conductor is inserted into the slot from the second end surface, the second segment conductor extends in the slot from an area of the second portion to the area of the first intermediate portion, an end of the second segment conductor is located in the slot, the first segment conductor and the second segment conductor overlap each other in the circumferential direction in the slot within the area of the first intermediate portion, the first side surface comprises a first protrusion provided by the first intermediate portion protruding with respect to the first portion and the second portion, and the first segment conductor and the second segment conductor are held between the first protrusion and the second side surface such that the first segment conductor and the second segment conductor are connected with each other.

2. The stator of claim 1, wherein the second side surface comprises a recess provided by the first intermediate portion being recessed with respect to the first portion and the second portion.

3. The stator of claim 1, wherein
the first segment conductor comprises a first thick portion and a first thin portion thinner than the first duck portion, the first thin portion is defined by an indentation provided in a side surface of the first segment conductor in an area including the end of the first segment conductor;

the second segment conductor comprises a second thick portion and a second thin portion thinner than the second thick portion, the second thin portion is defined by an indentation provided in a side surface of the second segment conductor in an area including the end of the second segment conductor, and the first thin portion and the second thin portion overlap each other in the circumferential direction in the slot within the area of the first intermediate portion in a state where the indentation of the first segment conductor and the indentation of the second segment conductor face each other.

4. The stator of claim 3, wherein five first protrusion is not in contact with the first thick portion nor the second thick portion.

5. The stator of claim 3, wherein,
the first protrusion is in contact with one of the first thin portion and the second than portion, and both of the second side surface within the area of the first portion and the second side surface within the area of the second portion are in contact with the other of the first thin portion and the second thin portion.

6. The stator of claim 1, wherein
the stator core comprises:
a third portion located closer to the second end surface than the second portion is; and
a second intermediate portion interposed between the second portion and the third portion in the axial direction, the slot extends along the axial direction across the first portion, the first intermediate portion, the second portion, the second intermediate portion, and the third portion, the coil comprises a third segment conductor and a fourth segment conductor, the third segment conductor is inserted into the slot from the first end surface in a position shifted along a radial direction of the stator core from the first segment conductor, the third segment conductor extends in the slot from the area of the second portion to an area of the second intermediate petition, an end of the third segment conductor is located in the slot, the fourth segment conductor is inserted into the slot from the second end surface in a position shifted along the radial direction from the second segment conductor, the fourth segment conductor extends in the slot from an area of the third portion to the area of the second intermediate portion, an end of the fourth segment conductor is located in the slot, the third segment conductor and the fourth segment conductor overlap each other in the circumferential direction in the slot within the area of the second intermediate portion, the first side surface comprises a second protrusion provided by the second intermediate portion protruding with respect to the second portion and the third portion, and the third segment conductor and the fourth segment conductor are held between the second protrusion and the second side surface such that the third segment conductor and the fourth segment conductor are connected with each other.

7. A manufacturing method of a stator, wherein
the manufacturing method comprises fixing a coil to a stator core, the stator core comprising a cylindrical shape, the stator cote comprises a first end surface and a second end surface ligated on opposite sides of the stator core in an racial direction of the stator core, the stator core comprises:
a first portion;
a second portion located closer to the second end surface than the first portion is; and
a first intermediate portion interposed between the first portion and the second portion in the axial direction, a slot is provided in an inner circumferential surface of the stator core, the slot extending along the axial direction across the first portion, the first intermediate portion, and the second portion, the slot comprises a first side surface and a second side surface facing the first side surface in a circumferential direction of the stator core, the coil comprises a first segment conductor and a second segment conductor, the fixing of the coil to the stator core comprises:
inserting the first segment conductor info the slot from the first end surface;
inserting the second segment conductor into the slot front the second end surface; and
rotating the first intermediate portion with respect to the first portion and the second portion, the inserting of the first segment conductor into the slot is performed such that the first segment conductor extends in the slot from an area of the first portion to an area of the first intermediate portion and an end of the first segment conductor is located in the slot, the inserting of the second segment conductor into the slot is performed such that the second segment conductor extends in the slot from an area of the second portion to the area of the first intermediate portion and an end of the second segment conductor is located in the slot, the inserting of the first segment conductor into the slot and the inserting of the second segment conductor into the slot are performed such that the first segment, conductor and the second segment conductor overlap each other in the circumferential direction in the slot within the area of the first intermediate portion, and in the rotating of the first intermediate portion, the first intermediate portion protrudes with respect to the first portion and the second portion at the first side surface to form a first protrusion, and the first segment conductor and the second segment conductor are connected with each other by being held between the first protrusion and the second side surface.

8. The manufacturing method of claim 7, wherein, in the rotating of the first intermediate portion, the first intermediate portion is recessed with respect to the first portion and the second portion at the second side surface to form a recess.

9. The manufacturing method of claim 7, wherein the first segment conductor comprises a first thick portion and a first, thin portion thinner than the first thick portion, the first thin portion is defined by an indentation provided in aside surface of the first segment conductor in an area including the end of the first segment conductor, the second segment conductor comprises a second thick portion and a second thin portion thinner than the second thick portion, the second thin portion is defined by an indentation provider in a side surface of the second segment conductor in an area including the end of the second segment conductor, and the inserting of the first segment inductor into the slot and the inserting of the second segment conductor into the slot are performed such that the first thin portion and the second thin portion overlap each other in the circumferential direction lit the slot within the area of the first intermediate portion in a state where the indentation of the first segment conductor and the indentation of the second segment conductor face each other.

10. The manufacturing method of claim 9, wherein the rotating of the first intermediate portion is performed such that the first protrusion is not in contact with the first thick portion nor the second thick portion.

11. The manufacturing method of claim 9, wherein the rotating of the first intermediate portion is performed such that the first protrusion is in contact with one of the first thin portion and the second thin portion, and both of the second side surface within the area of the first portion and the second side surface within the area of the second portion are in contact with the other of the first thin portion and the second thin portion.

12. The manufacturing method of claim 7, wherein the stator core comprises:
  a third portion located closer to the second end surface than the second portion is; and
  a second intermediate portion interposed between the second portion and the third portion in the axial direction, the slot extends along the axial direction across the first portion, the first intermediate portion, the second portion, the second intermediate portion, and the third portion, the coil comprises a third segment conductor and a fourth segment conductor, the fixing of the coil to the stator core comprises:
  inserting the third segment conductor into the slot from the first end surface in a position shifted along a radial direction of the stator core from the first segment conductor;
  inserting the fourth segment conductor into the slot, from the second end surface in a position shilled along the radial direction from the second segment conductor; and
  rotating the second intermediate portion with respect to the second portion and the third portion, the inserting of the third segment conductor into the slot is performed such that the third segment, conductor extends in the slot from an area of the second portion to an area of the second intermediate portion and art end of the third segment conductor is located in the slot, the inserting of the fourth segment conductor into the slot is performed such that the fourth segment conductor extends in the slot from an area of the third portion to the area of the second intermediate portion and an end of the fourth segment conductor is located in the slot, the inserting of the third segment conductor into the slot and the inserting of the fourth segment conductor into the slot are performed such that the third segment conductor and the fourth segment conductor overlap each other in the circumferential direction of the stator core in the slot within the area of the second intermediate portion, and in the rotating of the second intermediate portion, the second intermediate portion protrudes with respect to the second portion and the third portion at the first side surface to form a second protrusion, and the third segment conductor and the fourth segment conductor are connected with each other by being held between the second protrusion and the second side surface.

* * * * *